No. 810,802. PATENTED JAN. 23, 1906.
L. W. PARKHURST.
SAW GAGE AND JOINTER.
APPLICATION FILED JUNE 18, 1904.

WITNESSES:

INVENTOR
Lemuel W. Parkhurst
BY
ATTORNEYS

UNITED STATES PATENT OFFICE.

LEMUEL W. PARKHURST, OF TWANA, WASHINGTON.

SAW GAGE AND JOINTER.

No. 810,802.

Specification of Letters Patent.

Patented Jan. 23, 1906.

Application filed June 18, 1904. Serial No. 213,080.

*To all whom it may concern:*

Be it known that I, LEMUEL W. PARKHURST, a citizen of the United States, residing at Twana, county of Mason, and State of Washington, have invented new and useful Improvements in Saw Gages and Jointers, of which the following is a specification.

My invention relates to improvements in saw gages and jointers.

The object of my invention is to provide a form of gage which may be used in shaping as well as filing the raker-teeth and in which a movable member may be adjusted at different heights to suit the character of the teeth to which it is applied.

In the following description reference is had to the accompanying drawings, in which—

Figure 1:
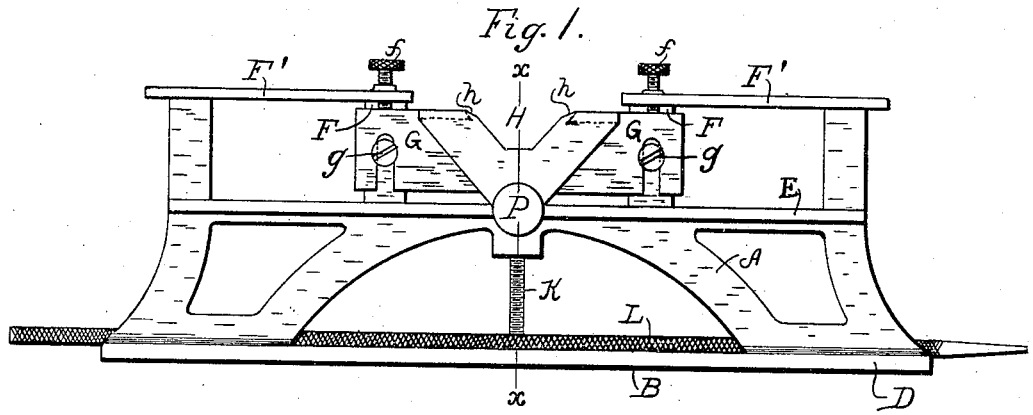
Figure 2:
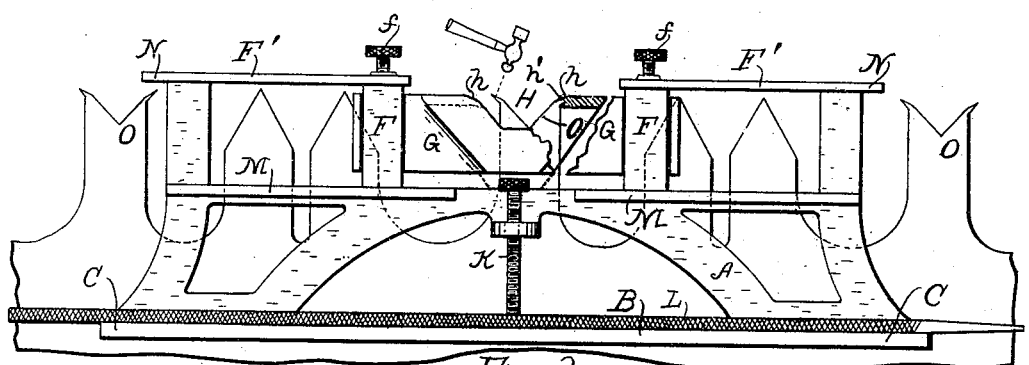
Figure 3:
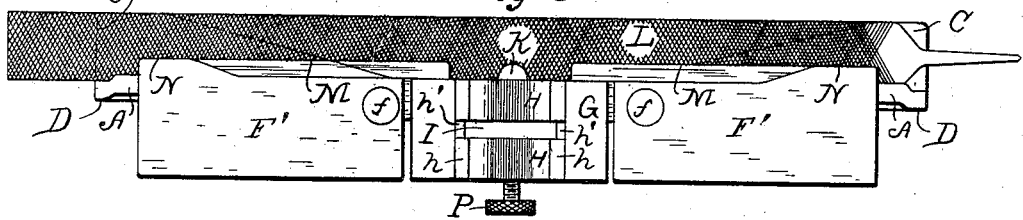
Figure 4:
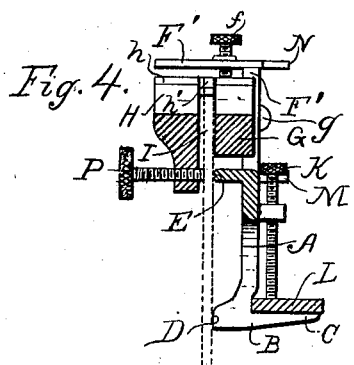

Figure 1 is a front view of my invention. Fig. 2 is a rear view of the same with the saw-blade in position and showing a portion of the adjustable gage members partially in section on the plane of the saw-blade. Fig. 3 is a plan view of my invention. Fig. 4 is a sectional view drawn on line $x\ x$ of Fig. 1.

Like parts are identified by the same reference characters throughout the several views.

A frame A is provided with a base B, which projects on the rear side of the frame to form a shelf C for the file and on the front side to form a rib D. Another bearing-rib E is located farther up on the frame, with its bearing edge in the same vertical plane as that of the rib D. The top portion of the frame is notched centrally and provided with posts F at the respective ends of the notch. Cap-plates F′ cover the end portions of the frame and rest upon the posts F, and adjusting-screws $f$ extend vertically through the cap-plate and engage in screw-threaded sockets in the ends of a gage member G, which is mounted in a notched portion of the frame and loosely engages the posts F, whereby the gage member G may be adjusted vertically by turning the screws $f$. Set-screws $g$ are used to lock the gage member in any desired position of adjustment. The gage member G is provided with a recess H in its upper surface, and a channel I extends upwardly from the lower edge of the member nearly to the upper edge, this channel being adapted to receive the saw-blade and permit the exposure of the teeth in the recess H. The upper surface of the member G is beveled downwardly and inwardly toward the recess H on both sides, as shown at $h$, the angle of this bevel being more open than the sides of the recess. That portion, however, of the member G which is directly over the channel I is partially cut away, as best shown at $h'$ in Fig. 2, leaving a beveled face corresponding with the face $h$, but offset outwardly therefrom, forming a small recess into which the point of the raker-tooth fits, as hereinafter explained.

K is a set-screw adapted to hold the file L on the shelf C when jointing the saw.

In operation when the saw is to be jointed the file L is secured on the shelf C by the set-screw K and the device inverted and placed in position against the saw, with the file resting on the points of the teeth and the ribs M and edges N (of the cap-plates F′) bearing against the sides of the saw-blade. The device is then reciprocated longitudinally of the saw and the projecting points of the teeth filed off. The gage is then applied to the raker-teeth, as shown in Fig. 2, one of the points O of the raker-tooth being left exposed in the recess H, the extremity of the tooth being then struck by a hammer or other suitable implement to bend the extremity of the tooth outwardly, the saw being in the meantime rigidly held in position by a clamping set-screw P. The saw is then moved longitudinally until the bent point of the raker-tooth is entered in the notch $h'$ on the adjacent side of the recess H, and the file is then applied to the tooth, which is filed down until the file lies flat on the beveled surfaces $h$ on each side of the recess $h'$. The device is then readjusted and the operation repeated on the other point of the raker-tooth. The gage member G is raised or lowered to vary the relative height of the raker-teeth in correspondence with the character of the wood to be cut. It will be observed that a gage thus constructed not only serves as a gage for determining the height of the raker-teeth, but as a die whereby the points of the teeth may be pressed or driven to the exact angle desired.

It will be understood that when the device is applied to the raker-teeth, as above described, the points of the other saw-teeth may be in contact with the cap-plates F′, the device being thus supported from the points of the ordinary saw-teeth, while the ribs E and D bear against the side of the saw-blade, as shown in Fig. 4.

Having thus described my invention, what I claim as new, and desire to secure by Letters Patent, is—

1. In a device of the described class, the combination with a frame, of a gage member comprising a block having a channel in its under surface adapted to receive the saw-blade, and a transverse recess in its upper surface communicating with the channel; the walls of said recess being faced off at their upper corners at outwardly-divergent angles from the sides of said recess and notched in the plane of said channel; the base of said notch being formed to extend divergently outwardly from the sides of the recess, and convergingly upwardly toward the planes of said faced-off upper corner portions.

2. In a device of the described class, the combination with a frame, of a gage member comprising a block having a channel in its under surface adapted to receive the saw-blade, and a transverse recess on its upper surface communicating with the channel; the walls of said recess being faced off at their upper corners at outwardly-diverging angles from the sides of the recess and provided with notches in the plane of said channel, adapted to constitute a die for the point of the tooth, and formed to permit an outward bending of the point of the tooth when forced into said die; together with means for vertically adjusting said block, whereby the length of the bent portion of the point may be varied.

In testimony whereof I affix my signature in the presence of two witnesses.

LEMUEL W. PARKHURST.

Witnesses:
 HARRY M. WILLEY,
 BENJAMIN C. WILLEY.